(12) United States Patent
Wormhoudt et al.

(10) Patent No.: US 10,643,263 B2
(45) Date of Patent: May 5, 2020

(54) METHOD AND APPARATUS FOR APARTMENT LISTINGS

(71) Applicant: RentPath, LLC, Atlanta, GA (US)

(72) Inventors: Doug Wormhoudt, San Francisco, CA (US); Blake Pierson, San Francisco, CA (US); Bryan Zachary Dilks, San Francisco, CA (US); Serena Keith, San Francisco, CA (US); Erik Preston, Berkeley, CA (US); Samuel Bolgert, Berkeley, CA (US)

(73) Assignee: RENTPATH, LLC, Atlanta, GA (US)

( * ) Notice: Subject to any disclaimer, the term of this patent is extended or adjusted under 35 U.S.C. 154(b) by 1004 days.

(21) Appl. No.: 14/179,465

(22) Filed: Feb. 12, 2014

(65) Prior Publication Data

US 2014/0229336 A1 Aug. 14, 2014

Related U.S. Application Data

(60) Provisional application No. 61/764,037, filed on Feb. 13, 2013.

(51) Int. Cl.
*G06Q 30/06* (2012.01)
(52) U.S. Cl.
CPC ............... *G06Q 30/0627* (2013.01)
(58) Field of Classification Search
CPC ................................. G06Q 30/0627
USPC ....................................... 705/26.63
See application file for complete search history.

(56) References Cited

U.S. PATENT DOCUMENTS

| 7,036,083 | B1* | 4/2006 | Zenith | H04N 7/17318 348/E7.071 |
| 7,743,337 | B1* | 6/2010 | Maeda | G01C 21/3667 340/995.1 |
| 8,095,434 | B1* | 1/2012 | Puttick | G06Q 30/0639 705/26.9 |
| 8,310,361 | B1* | 11/2012 | Stout | G06F 16/29 340/539.11 |
| 9,582,915 | B2* | 2/2017 | Dobrowolski | G06T 11/60 |
| 9,927,951 | B2* | 3/2018 | Gatter | G06F 3/0481 |
| 2007/0233367 | A1* | 10/2007 | Chen | G01C 21/00 701/408 |
| 2007/0271297 | A1* | 11/2007 | Jaffe | G06K 9/00664 |
| 2008/0086356 | A1* | 4/2008 | Glassman | G06Q 30/02 705/14.41 |

(Continued)

OTHER PUBLICATIONS

Anonymous, Windermere Real Estate Launches New PropertyPoint Searching Tool, Providing Online Home Buyers with Superior Accuracy and Location Details, Apr. 12, 2004, Business Wire, 5606, pp. 1-2. (Year: 2004).*

*Primary Examiner* — Jason B Dunham
*Assistant Examiner* — Brittany E Bargeon
(74) *Attorney, Agent, or Firm* — Morris, Manning & Martin, LLP; Daniel E. Sineway, Esq.; Daniel T. Begasse

(57) ABSTRACT

Four main sets of features designed to improve the apartment rental and listing process are discussed: (i) improved visualization of listings for renters using clustering, especially for mobile; (ii) landlord transaction flow and support; (iii) cross-checking of data using user-initiated third-party web data; and (iv) maintenance flow and support. The clustering approach provides visualization of dynamically developed clusters from available listings; rapid (re-)computation of clusters as the map is adjusted by users; and representation of all matching listings in the region in a cluster or as a single entry cluster at all times.

6 Claims, 12 Drawing Sheets

(56) References Cited

U.S. PATENT DOCUMENTS

| | | | | |
|---|---|---|---|---|
| 2008/0163090 | A1* | 7/2008 | Cortright | G06F 3/0481 715/771 |
| 2009/0143125 | A1* | 6/2009 | Baudisch | A63F 13/12 463/9 |
| 2010/0151838 | A1* | 6/2010 | Wormald | G08G 1/096716 455/414.1 |
| 2010/0216491 | A1* | 8/2010 | Winkler | G06Q 10/10 455/457 |
| 2011/0122153 | A1* | 5/2011 | Okamura | G01C 21/00 345/629 |
| 2011/0125594 | A1* | 5/2011 | Brown | G06Q 30/02 705/14.73 |
| 2011/0248863 | A1* | 10/2011 | Johnson | G08B 27/006 340/686.1 |
| 2012/0203771 | A1* | 8/2012 | Berry | G06Q 50/163 707/723 |
| 2013/0196614 | A1* | 8/2013 | Pahlevani | H04W 4/90 455/404.2 |
| 2013/0212065 | A1* | 8/2013 | Rahnama | G06F 17/30002 707/609 |
| 2013/0249812 | A1* | 9/2013 | Ramos | G06F 3/0481 345/173 |
| 2013/0332475 | A1* | 12/2013 | Michelstein | G06F 17/211 707/756 |
| 2014/0071170 | A1* | 3/2014 | Kroeber | G01C 21/367 345/660 |
| 2014/0088820 | A1* | 3/2014 | Jericho | G07C 5/008 701/32.3 |
| 2014/0218394 | A1* | 8/2014 | Hochmuth | G09G 5/377 345/629 |

\* cited by examiner

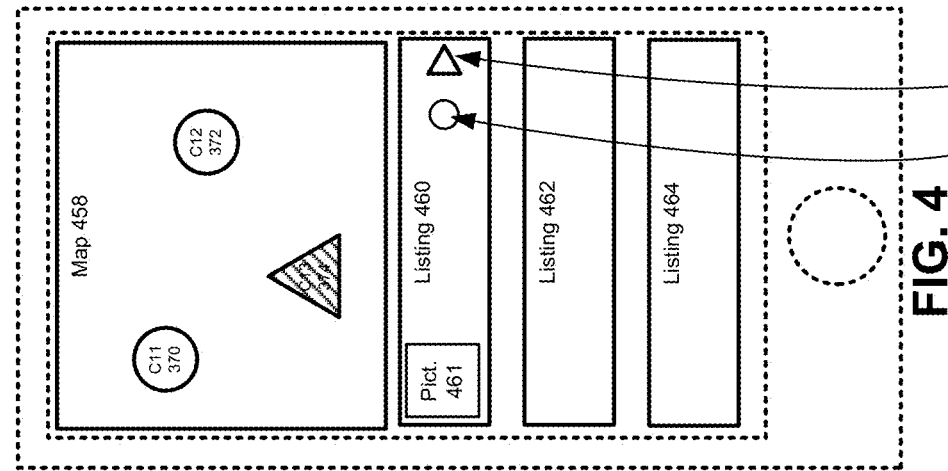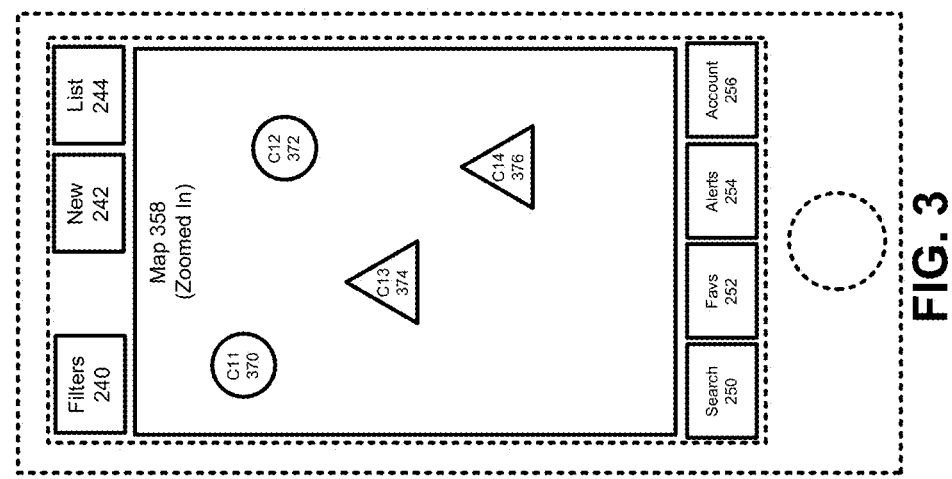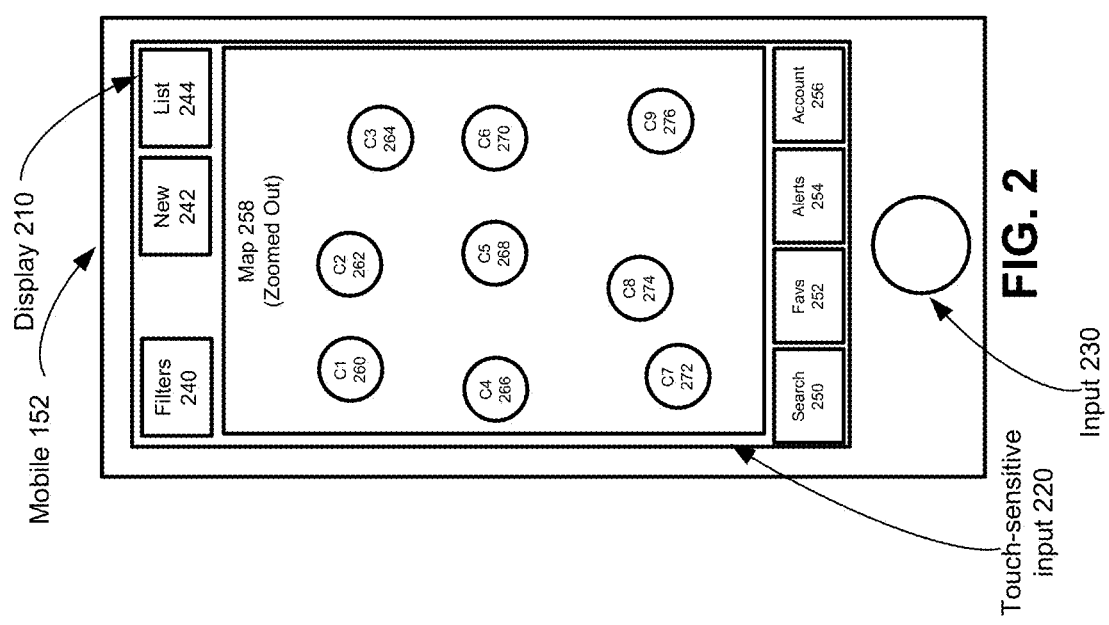

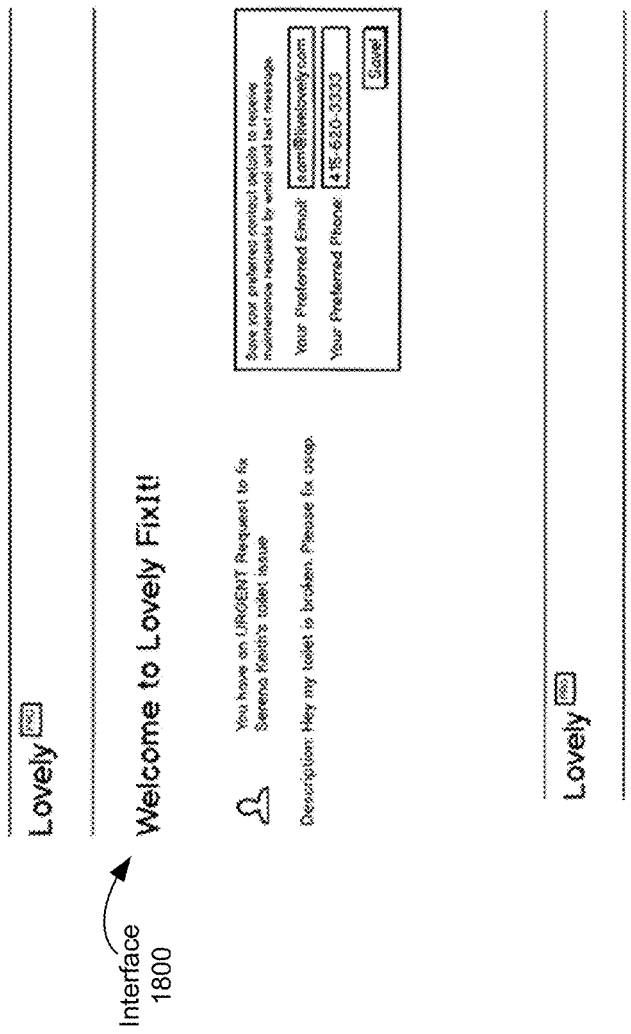

Sample Email 2000

From: fixit@livelovely.com

To: landlord@landlords.com

Subject: Maintenance Request for <<Tenant>> <<Property>> <<Id>>

Message Body:

Dear Landlord,

You have a request to fix <<Tenant>>'s toilet issue

Description

@lovelyfixit My toilet exploded. Please help #asap http://example.com/12345

What's next:

You can contact one of our recommended contractors to get this fixed. But first reply to this email to respond to your tenant. They'll receive your response immediately and know you're working on the issue 1. Plumber 1 – 5 stars 37 reviews
<<info1>>

2. Plumber 2 – 5 stars, 31 reviews
<<info2>>

3. Plumber 3 – 5 stars, 63 reviews
<<info3>>

FIG. 20

METHOD AND APPARATUS FOR APARTMENT LISTINGS

PRIORITY

This application claims the benefit of U.S. Provisional Patent Application No. 61/764,037, filed 13 Feb. 2013, which is incorporated herein by reference.

BACKGROUND

Field

This disclosure is generally related to systems for providing real estate related listings.

Related Art

Existing solutions for apartment and real estate listings generally offer limited support for end-user visualization of the available listings in a geographic region. Sites such as Zillow and Redfin are available and targeted at the home purchase market in the United States. However, sites for apartment listings have greater density, particularly in cities, that existing solutions do not easily support. Additionally, support for potential landlords and listing agents for the rental transaction process is limited in such solutions. For example, there are backend property management system such as Yardi and AppFolio that are dedicated to the property management side without offering the consumer facing tools.

BRIEF DESCRIPTION OF THE FIGURES

FIGS. 2-4 show user interfaces in accordance with various embodiments.

FIGS. 17-20 show a user interface in accordance with an embodiment.

DETAILED DESCRIPTION

Overview

Figure 1:
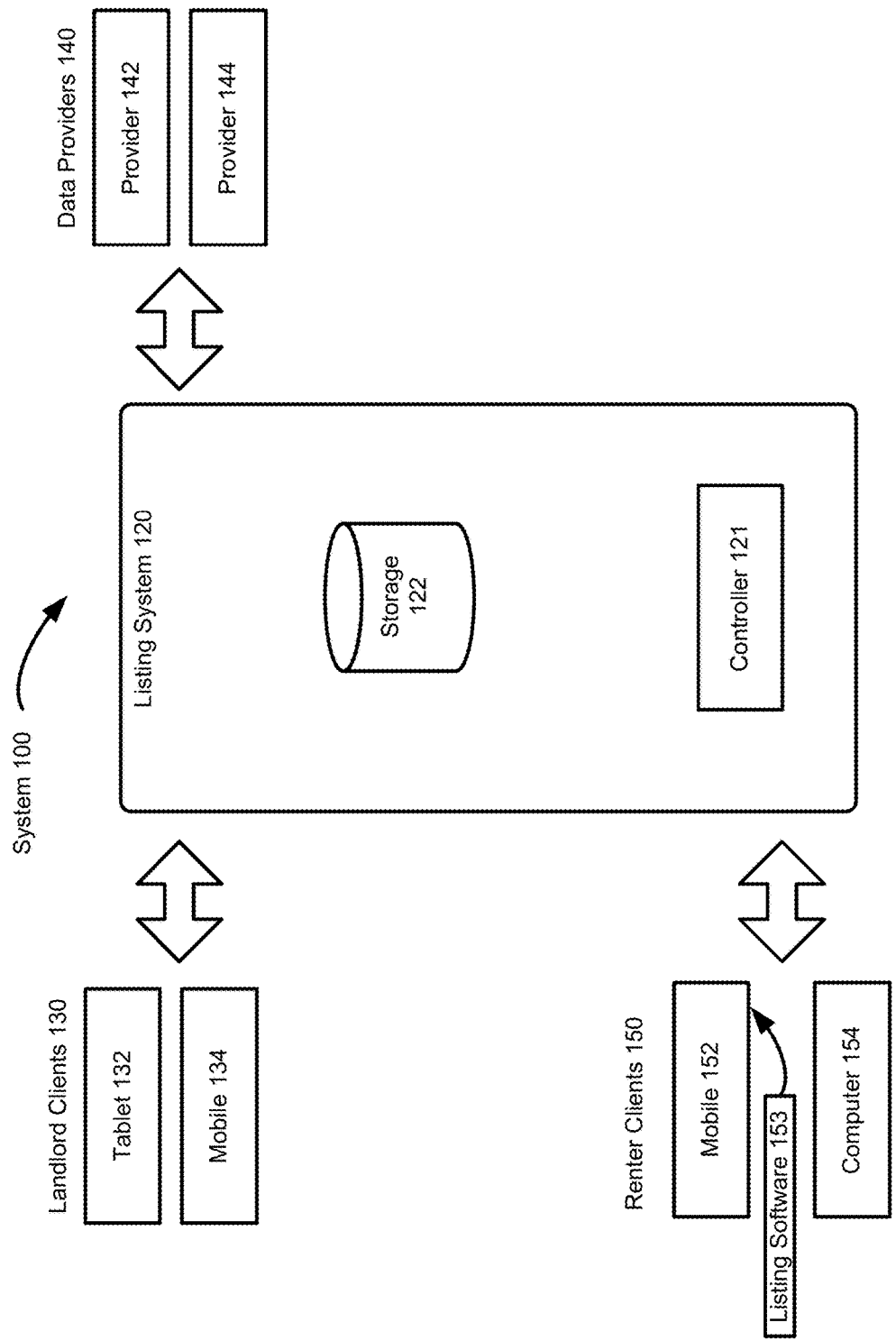
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high-level description of one embodiment will be discussed at an architectural level. Next, the user interface used by some embodiments will be discussed in conjunction with the details of algorithms used by some embodiments. Lastly, various alternative embodiments will be discussed.

In the discussion, four main sets of features will be considered: (i) visualization of listings for renters using clustering, especially for mobile; (ii) landlord transaction flow and support; (iii) cross-checking of data using user-initiated third-party web data; and (iv) maintenance flow and support.

Turning to each major feature in turn, consider Jane, an apartment hunter in San Francisco. Jane can use her mobile device, such as an iPhone 5 from Apple or a Nexus 7 tablet from Asus/Google, to browse listings. In the smaller-screen mobile environment, screen real estate is at a premium. Embodiments provide Jane access to all of the listings within the geographic region shown on her screen by using clustering to group listings within portions of the shown region. Thus, if Jane is looking at the city (and county) of San Francisco on the map of her mobile device, the city could be subdivided into regions with a single representative marker for the number of listings in that region. Thus, what starts as perhaps 9 or 10 large regions, each represented by a number, e.g. 137, together with an indicator code, e.g. color and/or shape coding to indicate listing statuses, will be dynamically reclustered into smaller regions as Jane zooms the map. The indicator codes can give Jane a sense of whether there are new listings in a cluster, whether she has previously tracked or marked as favorite a listing in a cluster, etc. Key aspects of this feature include: (a) dynamic development of clusters based on available listings, (b) rapid (re-)computation of clusters as Jane zooms the map in/out, (c) adjusting the map zoom based on user interaction with the cluster marker, (d) rules for setting cluster indicator codes, (e) representing all matching listings in the region in a cluster or as a single entry cluster at all times, (f) pop-up/slide-up user interface for viewing specific listings, and (g) specific techniques for defining alerts on mobile.

Turning to the landlord flow, consider Lisa, a landlord for an apartment in San Francisco. Lisa has only a small number of units she is responsible for renting and, as such, Lisa does not have a proprietary system for managing prospective tenants and reviewing applications. Embodiments provide a hosted solution for the landlord flow. One piece of the flow is a renter's card which allows Jane to provide an initial batch of key information directly to landlords and their representatives like Lisa. In one embodiment, prospective tenants such as Jane can submit their renter card from their mobile device in response to a listing. Additionally, at open houses Lisa can use a mobile device to accept basic renter card information from users directly or use techniques such as NFC, barcodes, QR codes, short URLs, or similar to allow prospective tenants using a mobile application to quickly submit their renter card. The renter card is designed to provide a baseline set of information, such as name, contact information, current employment status, and self-reported credit score (see discussion of FIG. 11 for more details). LiveLovely has determined that most landlords can make a preliminary screening decision about applicants from this self-reported data.

In some embodiments, the hosted landlord processes can apply automated rules to filter the submitted renter cards. Embodiments also provide Lisa access to information about all of the rental prospects and their status. Some embodiments support a full visit-to-rental process, e.g. receipt of a more detailed application, running third-party credit reports, sending reference letters/emails/calls, generating rental agreements, etc. Other embodiments track that workflow and can store key documents. Still other embodiments provide even greater support, e.g. holding security deposits, returning security deposits, and/or collecting periodic rent checks.

Another feature of some embodiments is cross-checking of data. In some embodiments, the operator of the mobile listing service may obtain listings using data feeds from third-party sources. Those data feeds might be out of sync with the underlying source data. For example, if data feeds come from a website and the website listing is updated, the data feed might not receive the update immediately. In one embodiment, the application on the mobile device may offer users the opportunity to review the original listing, e.g. at the original website. In one embodiment, this original listing is opened in a web viewing element within the context of the mobile listing application. In this embodiment, the current version of the website listing can be transmitted from the mobile listing application back to the server for analysis and updates. This can enable the operator of the listing search to have fresher data than the data feeds it receives without scraping websites.

Terminology

Throughout this specification the following terms will be used:

Listing: A listing, sometimes apartment listing or rental listing, is a representation of a property for rent by individuals or businesses. The primary examples are real property such as homes or apartments that individuals can rent for a period of time, e.g. a year. Shorter-duration listings, e.g. vacation rentals, could be included, as could other types of rental listings, e.g. room shares and sublets. However, embodiments are focused on supporting real property rentals of generally longer durations. Thus, the primary focus of discussion will be on residential real estate rentals, but embodiments could be adapted to support other uses.

Mobile Device: A mobile device is a portable electronic device, such as a mobile phone, smartphone, tablet, managed laptop or the like. Mobile devices differ from general purpose computing devices in that the operating system provides a more secure initial environment, e.g. digital signing of applications, an application store (and policies on what can be in the application store), restrictions on certain applications operating in the background, and restrictions on modifying the operating system. These restrictions generally impede the use of existing software and OS modification techniques used on general purpose computers to provide enterprise security. Current exemplary mobile devices include iOS devices, such as the iPhone and iPad; Android devices, such as the Nexus smartphone and Samsung Galaxy tablet; Windows mobile devices; Chrome laptops; Android wrist watches; and some netbooks with mobile-style operating systems. Generally, embodiments are targeted at small, handheld devices that a user can easily transport. Additionally, the mobile device will have a display and user input capabilities. In some instances tablets may be called out separately from other mobile devices, the primary distinction in current generation devices being the size of the screen, e.g. a 4"form factor is common on mobile phones, while a 7" or 10" form factor is more common on tablets.

System Overview

A system and processes for mobile apartment listings is described. The system and processes will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes a system 100. The system includes listing system 120, landlord clients 130, data providers 140, and renter clients 150. The listing system 120 includes controller 121 and storage 122. The landlord clients 130 include tablet 132 and mobile 134. The data providers 140 include provider 142 and provider 144. The renter clients 150 include mobile 152 and computer 154. Mobile 152 includes listing software 153.

The interconnection of the elements of system 100 will now be described. The listing system 120, landlord clients 130, data providers 140 and renter clients 150 are coupled in communication (indicated by double-headed line with arrows at end). The actual communication path can be point-to-point over public and/or private networks. Some items such as listing software 153 might be delivered indirectly, e.g. via an application store (not shown). All of the communications may occur over a variety of networks, e.g. private networks, VPN, MPLS circuit, or internet, and may use appropriate APIs and data interchange formats, e.g. REST, JSON, XML, SOAP and/or JMS. All of the communications can be encrypted. This communication is generally over a network such as the internet, inclusive of the mobile internet, via protocols such as EDGE, 3G, LTE, WiFi, and WiMax. Additionally, a variety of authorization and authentication techniques, such as username/password, OAuth, Kerberos, SecureID, digital certificates, and more, can be used to secure the communications.

Controller 121 and storage 122 can include one or more computers and computer systems coupled in communication with one another. They can also be one or more virtual computing and/or storage resources. For example, controller 121 may be one or more Amazon EC2 instances and storage 122 may be an Amazon S3 storage. Other computing-as-service platforms such as Force.com from Salesforce, Rackspace, or Heroku could be used rather than implementing listing system 120 on direct physical computers or traditional virtual machines.

Generally speaking from a functional standpoint, the data providers 140 provide listings to the listing system 120. In some instances a landlord client 130 can serve directly as a data provider 140, e.g. landlord self-enters a listing. In other instances, the data providers are third-party services such as Craigslist, multiple listing service (MLS), Apartments.com, AppFolio, ShowMeTheRent, Westside Rentals (regional provider), as well as other internet listing services (ILSs). The data can be obtained through a variety of mechanisms, e.g. pull/push, APIs, FTP upload, FTP download, as well as crawling/screen scraping (when permitted). During pull/push operations, the data is often retrieved over HTTP (with or without TLS) and the data format is frequently XML; however, SOAP and JSON are also commonly used formats.

The landlord clients 130 are primarily for landlords and/or property managers to review rental applications and manage their rental properties. The landlord clients 130 may be running software such as listing software 153 (in landlord mode) or separate software (not shown), or can use a web browser to interact with the listing system 120.

The renter clients 150 are primarily for potential tenants to find places to rent and complete the application process. In one embodiment mobile clients are supported using software such as the listing software 153 that has been optimized for touch interfaces. Separately, a web-based interface exists for clients such as computer 154 and can also be used for mobile clients for which dedicated listing software 153 is unavailable.

Having described the elements of FIG. 1 and their interconnections, the system will be described in greater detail in conjunction with the discussion of several sets of features starting with the mobile reclustering (and clustering).

Mobile Reclustering

Figure 5:
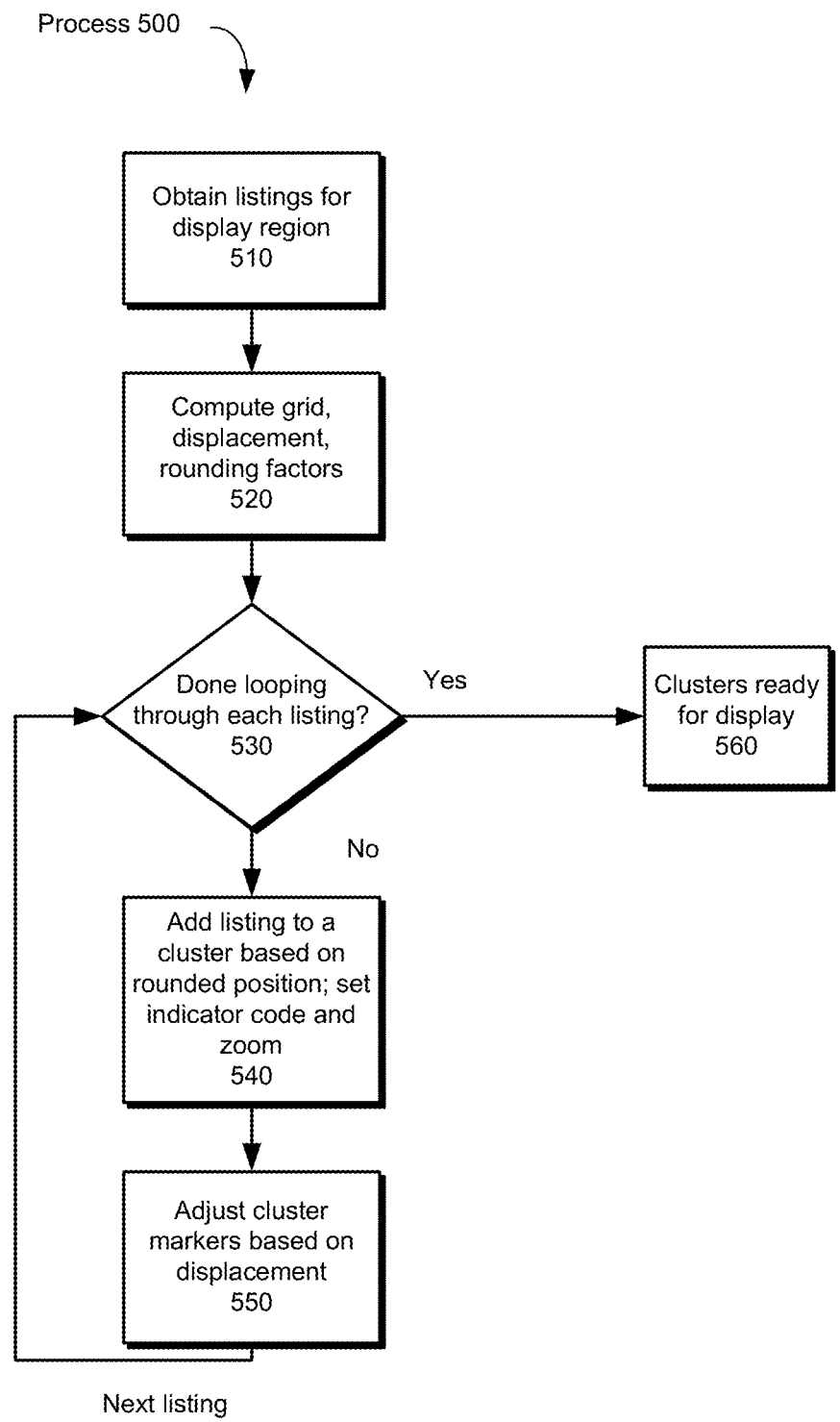
FIG. 5 is a process flow diagram for clustering according to an embodiment.

The approach to mobile clustering will be described in conjunction with FIGS. 2-5. FIGS. 2-4 show user interfaces in accordance with various embodiments. FIG. 5 is a process flow diagram for clustering according to an embodiment.

Turning to FIG. 2, the mobile 152 is shown with a display 210 which has a touch-sensitive input 220 and input 230. In the mobile user interface figures, mobile 152 is only shown explicitly in FIG. 2; in the remaining figures the dotted lines represent the device and related items. The device used in these examples is a prototypical current generation touch-screen mobile device, such as an iPhone from Apple Inc.; however, other mobile devices could be used. Additionally, the user interface depictions are intentionally sparse to focus on key elements.

FIG. 2 shows an exemplary zoomed out map view, map 258, for searching listings. There are controls at the top and bottom to navigate the listings. The top controls allow the user to adjust the displayed search: set filters (filters 240) for things such as price, pets allowed; establish a new alert (new 242); and switch to a list style representation of results (list 244). The bottom controls switch among modes: search 250 (currently active), favorites 252 (lists favorites flagged by user), alerts 254 (lists alerts previously set by user, see discussion of FIGS. 6-7 for establishing new alerts), account 256 (manages the renter's account, e.g. renter card, payment info).

Of specific interest are the clusters C1 260, C2 262, C3 264, C4 266, C5 268, C6 270, C7 272, C8 274, and C9 276. Each cluster represents a group of listings in the geographic region surrounding the marker. In one embodiment each cluster is shown with a number, e.g. 10, 300, 2, representing the number of listings within the cluster. In some embodiments a mixture of size, shape, color, and/or other distinguishing features is used to provide information about the cluster contents to renters.

For example, in one embodiment, colors such as blue, red, yellow and black are used to distinguish clusters. Yellow clusters have at least one listing that the renter has marked as a favorite. Red clusters have at least one new, or "fresh", listing since the last time the renter searched that region. Black clusters represent the currently selected cluster. Blue, then, is the default color in this embodiment for unviewed and grey represents unviewed. In such embodiments rules may be used to control the color setting, e.g.:

- selection (black) overrides other color choices so the user sees their selection
- then fresh listings (red) if there is at least one fresh listing (optionally: only for unviewed fresh listings)
- then favorites (yellow) if there is at least one favorite
- then the default (blue) if there is at least one unviewed listing
- finally viewed (grey) if all of the listings are viewed in a cluster In some embodiments, color coding is only applied at certain zoom levels, e.g. only when the map is zoomed in to a level a detail greater than city labels are color codings applied. In the examples of FIGS. 2-4, color coding is not shown, but shape coding is used to show fresh listings (triangles) and stippling is used to show the currently selected listing. In this example, the coding is only applied at close zooms, e.g. FIGS. 3-4. In some embodiments, the (color) coding is specific to a given renter's last view; in other embodiments the coding is generic to the time the listing was received, e.g. new in last 24 hours=red.

Looking at FIG. 2 it should be noted that the clusters C1-C9 are not evenly distributed in a grid across the map. This is because the cluster position is determined based on the location of listings. For example, the overly wide space between the C8 and C9 clusters might correspond to a region with less or no housing.

When a renter touches a cluster, e.g. cluster C5 268, the map zooms, e.g. to FIG. 3, showing map 358. This causes updated clusters to be shown corresponding to listings in the new map region, e.g. C11 370, C12 372, C13 374 and C14 376. As noted, in this example, clusters C13 and C14 are marked with different shapes to indicate fresh listings received in the last 24 hours that are unviewed. At a high enough zoom as in FIG. 3, if the renter touches a cluster again, e.g. C13 374, the map is readjusted, see FIG. 4 and map 458, to show the selected cluster C13 374 together with the specific listings, listing 460, listing 462, listing 464. Coding, e.g. color changes, can be used to indicate the selected cluster as was done in this example by changing the color with stippling. Listing 460 can include information (not shown in the figure) such as the address, price and bedrooms, together with a picture, e.g. pict 461, indicator 463, and a mechanism to get more info (more info button 465). The indicator 463 can be coded using the color, shape and/or other indicator approaches described above. In another embodiment, the indicator 463 is solely a favorite/viewed/unviewed indicator. Additionally, at a listing level there may be additional indicators, e.g. "featured," "top landlord," "green building," "popular," or the like as well.

So far in this discussion several key features of embodiments have been covered:

- Map automatically zooms as user interacts with cluster marker (FIG. 2 to FIG. 3 transition)
- Pop-up or slide-up interface for viewing listings (FIG. 3 to FIG. 4 transition)
- Clusters can include indicators (color, shape, icon, and/or size) often together with a number that are adjusted based on rules and the contained listings Now let's turn to FIG. 5 to discuss three additional key features of embodiments:

- Dynamic development of clusters from available listings
- Rapid (re-)computation of clusters as map is adjusted
- Representation of all matching listings in the region in a cluster or as a single entry at all times These three user benefits derive from an O(N) approach to quickly cluster listings. This enables large data sets to be (re-)clustered in real time—specifically here "real time" refers to a reasonable human interface usability response time for generating an updated map during operations. In one embodiment, during a map zoom in/out, the clusters can be regenerated roughly as quickly as the map can be reloaded on the mobile device. This is in contrast to traditional k-means clustering approaches that in the most generic form are NP-hard, but there are heuristics such as Voronoi iteration/relaxation that are faster than NP-time. However, such approaches are not sufficiently fast to provide real-time (re-)clustering of thousands of data points as a user moves and zooms a map.

On mobile, three groupings of zoom levels are used: (i) city/higher zoom, (ii) macro level (FIG. 2), and (iii) detailed (FIGS. 3-4). At the city or higher-level zooms, on mobile trying to represent individual listings is avoided in favor of using city, or state, centers is used. Depending on the embodiment, specific user filters may be ignored at this stage, thus placing an emphasis on total units available in the region. At these higher zoom levels (not shown in FIGS. 2-4) city, or state, labels are used. Thus the user might see labels for "San Francisco", "Daly City", and "Colma". The labels may be altered in appearance (including optional numeric indicators) based on the number of listings. To avoid map clutter, cities, or states, are merged if the labels would overlap. In one embodiment, the larger city, or state, label remains. Thus Daly City with a population of over 100,000 would be used over Colma with a population just shy of 2,000. Some embodiments may reposition city, or state, labels based on rental listing locations as opposed to the city center.

The neighborhood and detailed views use the same clustering approach of FIG. 5 including process 500 that uses only simple rounding to cluster the listings and the approach only "touches" each listing one time. This facilitates rapid cluster development. As an aside, the discussion focuses on using rectangular grids; however, more generally any tessellated pattern could be used.

Process 500 begins at step 510 with obtaining the listings for the display region of the map. In one embodiment this is performed on the listing system 120, e.g. as a database query; in other embodiments, the mobile device may have some or all of the listing data locally fetched from the listing system 120. Because process 500 is highly computationally efficient, rounding is the primary operation; it could be performed on a mobile device with ease. For this discussion, we will describe the process 500 as primarily occurring on the listing system 120. Similarly, the process 500 will be described substantially serially; however, partial or full parallelization is possible. At step 510, filters the renter has established, such as price, pets allowed, number of bedrooms, can be applied to the total available listings to be clustered. In other embodiments, you could pre-store the rounded values in the database. However, this approach is storage inefficient and would require additional data retrieval per query for building the cluster location when the exact location is used at step 540.

At step 520, the grid, displacement and rounding factors to be used are computed. This step leverages the grid of the map and the zoom level to define an initial grid that covers the contained region of the map. Conceptually, each grid square will become a cluster. Because displays are not square, ratios are used to define the grid, and displacement factors are used to prevent overlapping clusters. In one embodiment, the displacements and ratios are predefined values based on predefined map zoom levels. Conceptually the displacement factor describes a border within the grid cell setting the outermost allowed position for the center of a cluster marker (e.g. C1 260 of FIG. 2 or C11 370 of FIG. 4) within the grid cell.

Steps 530-550 represent the main loop. At step 530 if every listing retrieved at step 510 has been clustered, the process proceeds to step 560 where they can be displayed, e.g. as shown in FIGS. 2-4. In some embodiments, step 560 may include computing the zoom location can be computed as part of step 560 as well. Otherwise, each listing is examined at steps 540-550. At step 540, the listing is added to the respective cluster based on rounding the latitude/longitude. The cluster zoom location (zoom-to-position) and indicator code is also updated. The indicator code is the color-coding as described above, e.g. red for fresh listings, yellow for favorites in cluster, etc. The zoom location according to one embodiment is the center point of the listings in the cluster, and can be maintained by cumulating the latitudes and longitudes and then, when clustering is finished (e.g. at step 560), dividing by the number of listings in the cluster. This allows embodiments to support a separate cluster indicator latitude/longitude different from the zoom latitude/longitude. One embodiment sets the zoom to the weighted geographic center of the cluster based on the listings. However, other embodiments might adjust the zoom based on rankings and/or featured listings. For example, if the featured listings are focused in one area of the grid, the zoom might go to the weighted center of the featured listings instead.

At step 550, the display position of the cluster marker can be adjusted to prevent cluster marker overlaps by respecting the displacement. In some embodiments, this is computed as a post processing step, e.g. in step 560. Notably, according to some embodiments clusters may have up to three distinct sets of positional parameters: exact position, adjusted display position (based on displacements), and zoom location. Additionally, some embodiments may make use of alternative approaches to avoiding cluster marker overlaps than the displacement grid. For example, if variable sized cluster markers are used, the simple displacement grid may be both over and under aggressive in setting the allowed positions. Thus the actual approach used by a particular embodiment can reflect the range of cluster marker sizes and shapes used and perform adjustments to keep the cluster markers non-overlapping.

As seen, this approach is extremely computationally efficient since the primary mathematical operations are rounding, addition, and some comparisons to merge clusters. Further, because each listing only needs to be reviewed once, it also performs quite efficiently.

This approach also ensures that every listing in a region can be simultaneously displayed at all times. Many existing real estate programs silently filter the listing, e.g. show only n listings, e.g. 500, 1000, etc. Process 500 provides an efficient approach to handling a virtually unlimited number of listings simultaneously while still providing real-time performance.

Figure 7:
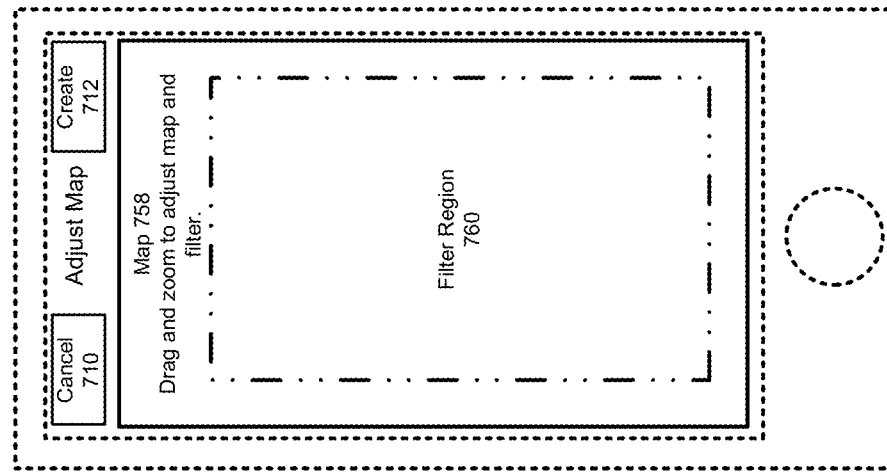
Figure 6:
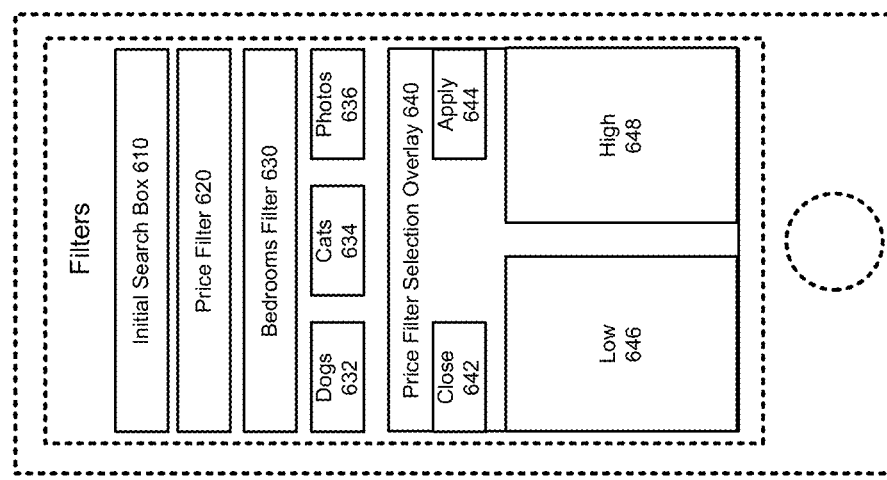

Turning now to another feature, mobile alert definition, this feature will be described in connection with FIGS. 6-7. In FIG. 6 the user interface for a form-oriented filtering is shown. In FIG. 6, the initial form-oriented filter criteria can be defined. In some embodiments, this form is accessed by the filter button (filters 240). The initial search box 610 accepts map-type inputs: ZIP codes, states, city names, street addresses. The price filter 620 brings up the price filter selection overlay 640 overlaying the bottom of the form (not shown) to allow the user to set a low 646 and high 648 price they will pay and, when done, either apply 644 their filter or close 642 without applying. Filters are provided for many common search needs: number of bedrooms filter 630, dogs 632 allowed, cats 634 allowed, photos 636 available. This helps bring the prospective renter to the basic group of listings they are interested in. As discussed in connection with FIGS. 2-4 and process 500 of FIG. 5, the filter adjusts the listings available for clustering and can be performed in real time.

Beyond filtering listings, it is useful to be able to save an alert. FIG. 7 shows a user interface for defining an alert on a mobile device. Specifically, from FIGS. 2-3 the new 242 button can be touched to bring up the interface of FIG. 7 for defining the geographical filter. The map 758 corresponds to the then-displayed map, e.g. map 258 or 358 (including any shown clusters according to some embodiments). Instructions have been superimposed to drag or zoom the map to adjust the filter, and a filter region 760 is shown which will be the search region. In one embodiment the filter region 760 is rendered in full color, while portions of the map outside the filter region are shaded out. In some embodiments as the renter adjusts the map zoom, cluster indicators are displayed and dynamically (re-)clustered, see process 500 of FIG. 5, during the adjustment of the filter region 760 contents. Once the renter is satisfied with the displayed region, the renter can save the alert using the create 712 button. In one embodiment, the filters set (see FIG. 6) are carried over to the alert. This is a fast approach to defining a saved geographical search, or alert, that is highly efficient for mobile use. Additionally cancel 710 button is provided to exit the adjustment view. Notably this approach flips the typical drag a box over a map approach on its head in that the filter region 760 is fixed in size, shape and position. Instead, user interactions to adjust the map to fit within the region.

In some embodiments, the previously displayed map is automatically zoomed to fit within the filter region 760. This avoids the potential pitfall of a user adjusting her map view, going to create a filter and now finding herself having to zoom the map out to get exactly what she already wanted in the filter.

In some embodiments, the filters of FIG. 6 include filters for open houses (not shown) as well as specific dates/times. Still other embodiments include a schedule builder for apartment hunting (not shown). For example, in one embodiment, within your filter a proposed schedule of open houses you have not visited can be automatically constructed. This can include taking into account what open houses you've previously attended; the available open houses for either that day or a day you specified; and a routing between the open houses accounting for time at the open house, the hours of the open house, and travel time.

Figure 8:
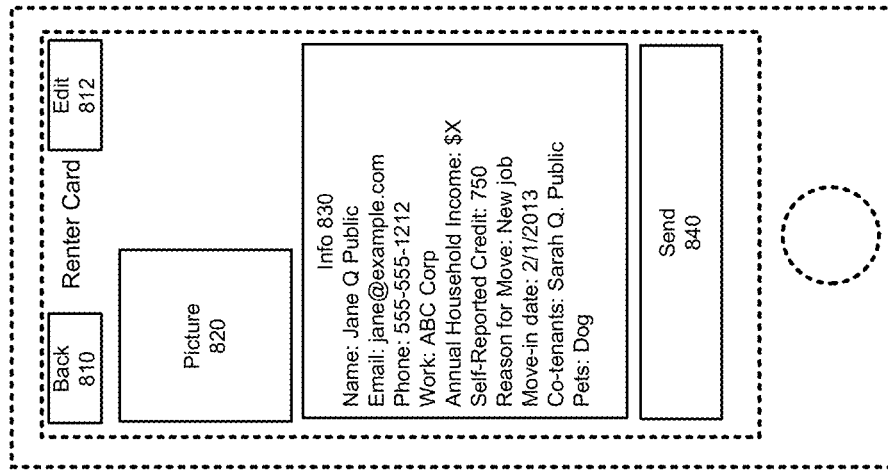
FIGS. 6-10 show user interfaces in accordance with various embodiments.

Turning to FIG. 8, a user interface for one embodiment of a renter card is shown on a mobile device. The renter card includes navigation buttons: back 810, edit 812, and send 840, as well as informational regions, such as a picture 820 and info 830. The info 830 includes key data LiveLovely has identified as helping landlords make initial decisions: name, contact info (email, phone), employment/salary/credit info (employer, income, self-reported credit score), reason for moving, target move-in date, identification of co-tenants, and whether there are pets. The specific fields were chosen because they are highly correlated with making initial landlord screenings and are relatively short. A mechanism for editing the renter card (edit 812 button) is provided. Either the send action (triggered by send 840) or the screen can also offer an opportunity to provide context-sensitive information relating to the specific listing. For example, do you want to see the listing you were last viewing? Similarly, in some embodiments, sending a renter card may automatically mark a listing as a favorite or put it in another category of applied-for listings. The specific transmission mechanisms can also vary depending on the context.

One transmission mechanism is remote submission via the listing system 120. In this mechanism, appropriate submissions are made to update the listing system to provide the renter card to a landlord. This would show up in the landlord interface (see, e.g. FIG. 14). In still other embodiments, local communications systems may be used to send the renter card. For example, while attending an open house, a landlord might have their tablet 132 sitting out. Prospective tenants could submit their renter cards using a variety of more direct communication approaches, e.g.: NFC communications, Bluetooth, local WiFi, camera scans of a barcode generated by either the display of tablet 132/camera of mobile 152 or display of mobile 152/camera of tablet 132. Irrespective of transmission mechanism, one embodiment aggregates the renter cards and other information transmitted into the landlord user interface (see FIGS. 14-17). Additionally, other embodiments provide support for the renter card to be emailed, faxed, or otherwise transmitted directly to the landlord (not shown) instead of being entered into a landlord user interface.

The common thread of the transmission mechanisms is that they provide a rapid way for renters to indicate their interest in a listing, either in person or remotely, and a rapid way for landlords to screen prospective tenants. More generically than the specific example of FIG. 8, the renter card can be thought of as analogous to a calling card for renters: it is a snapshot of what would be on a full application with only the most important parts. A full application typically has 50-plus fields. A renter card has far fewer fields, around the number seen in FIG. 8. The goal of a renter card is to get the landlord-renter conversation started and boost the renter's chance of being reviewed seriously. In metropolitan areas like San Francisco, it is common for landlords to get more than 20 inquiries for a listing; thus, the renter card helps the renter stand out and makes responses and the overall rental process easier.

Some embodiments allow landlord clients 130 to directly accept renter cards from prospective renters who either lack renter clients 150 or prefer not to install the listing software 153 (if required). In these embodiments, the landlord can briefly hand their tablet 132 to a prospective renter and allow them to fill out the renter card (similar to FIG. 8) on the spot and have the card entered into the system.

Cross-Checking Data

Figure 11:
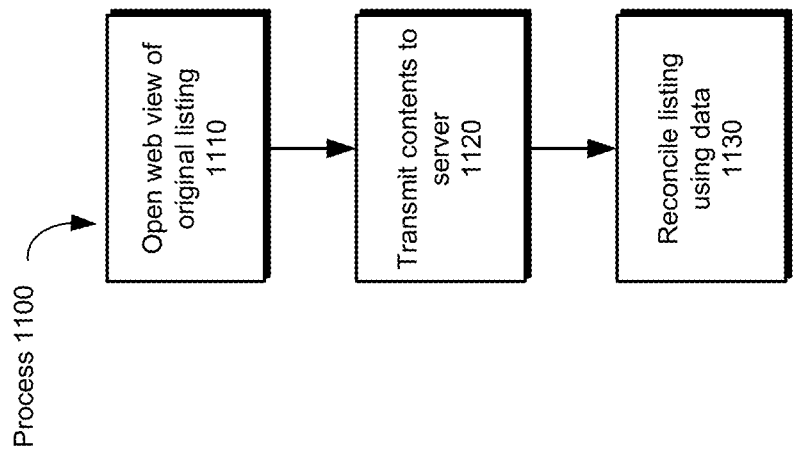
FIG. 11 is a process flow diagram for cross-checking data.
Figure 10:
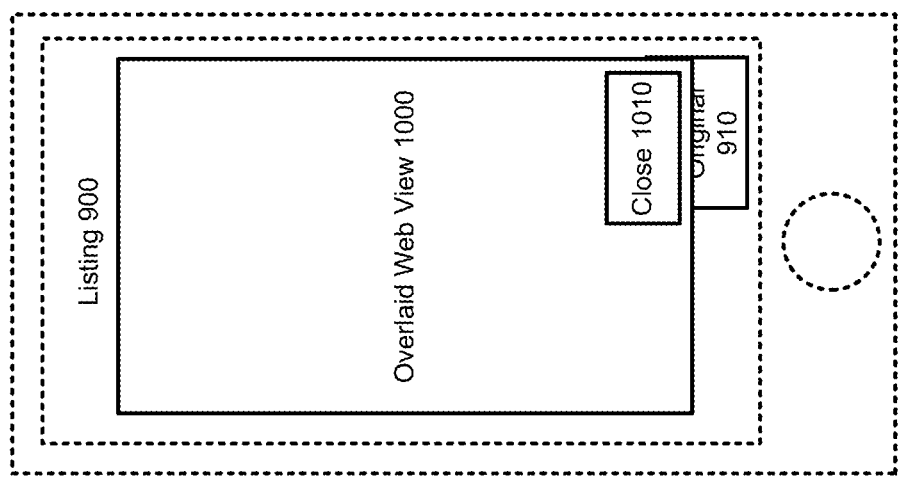
Figure 9:
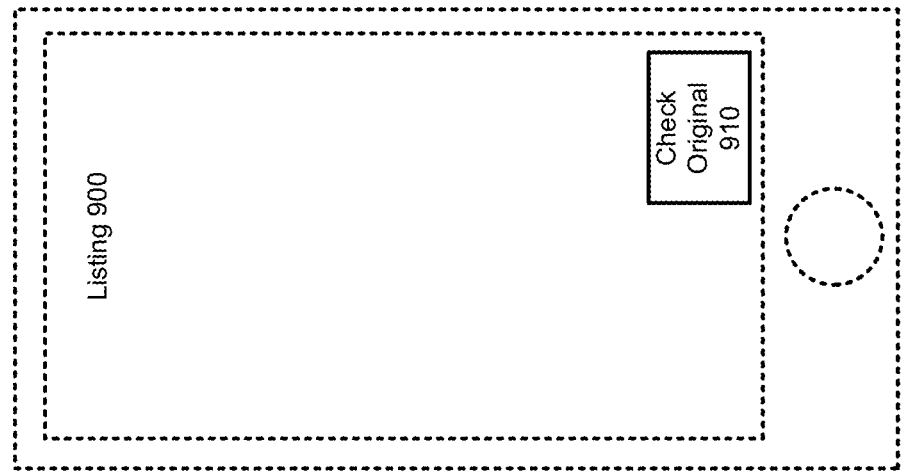

Turning to FIGS. 9-10 which show user interfaces for cross-checking data and FIG. 11, a process flow diagram for cross-checking data, a mobile feature will be considered.

As discussed in connection with FIG. 1, many listings come from data providers 140 en masse. In some instances, the listing system 120 may only receive periodic updates, e.g. weekly. Additionally, for listings that were sourced off-site, it may be that there is additional information in the original listing that is not available in the listing system 120.

Accordingly, some embodiments provide a mechanism for not only showing the original listing on mobile, but also cross-checking and updating the data in the listing system 120 based on the mobile device retrieval.

Considering the listing 460 of FIG. 4, if the user touches the more info 465 button, the more detailed listing 900 of FIG. 9 could be shown. Of note for this discussion is access to a button to enable the renter to check the original listing (check original 910 button). This button brings up a web view inside the application, e.g. overlaid web view 1000 of FIG. 10. The overlaid web view 1000 includes a close 1010 button.

In the mobile context, when listing software 153 is used for access to the listing system 120, the web view 1000 advantageously can exist in the process space of the listing software 153. Thus, it is possible for the listing software 153 to access the listing. Because a user-initiated action (touching check original 910 button) triggered the retrieval of the web page, this approach does not require crawling/scraping of websites for data.

Process 1100 of FIG. 11 explains how this data can be used. At step 1110, the web view is opened and the original listing retrieved on the mobile device. Next, at step 1120, the mobile 152 transmits the web page contents to the listing system 120. Next, at step 1130, the listing system 120 reconciles the newly received data with the existing listing.

In some embodiments, each field of the existing listing is reviewed for potential changes in the new data. This approach avoids an all-or-nothing problem where either the existing listing or the new listing has to "win." Instead, individual fields, like rental status (for rent, rented), price, open house times, can be updated from the web data. Thus, one user's decision to check the original listing will help other subsequent users have more current data without more frequent updates.

Application Support

Figure 12:
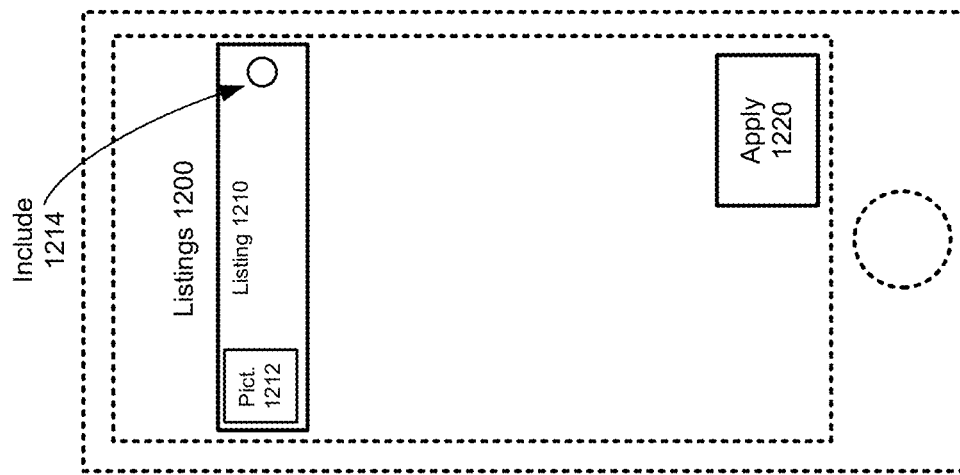
FIG. 12 shows a user interface according to an embodiment.

Embodiments also support submitting mobile applications directly to landlords. The application process can either be linked to a detailed automated flow or result in submission of electronic images of completed applications. In one embodiment, standard applications for regions are identified and pre-loaded into the listing system 120. This allows users to one-click apply to multiple properties as seen in FIG. 12. Specifically, a list of listings the renter has identified is shown in listings 1200; here only one (listing 1210) is shown in partial detail (picture 1212 and include 1214). The listings include a checkbox or other mechanism for the user to indicate whether to include the listing in applications, here include 1214.

Once the renter touches apply 1220, the application for all of the included listings is completed. In some embodiments, minimal or no data entry is required if the renter has previously used the listing system 120 to apply for apartments, because the appropriate rental application can be pre-populated based on previous answers.

In some embodiments, the apply 1220 button leads to a payment confirmation screen (not shown) to verify and collect payments. In other embodiments, any per-application additional data is captured together with any per-application signatures or verifications required. For example, third-party document-signing services could be integrated to capture various signatures or biometric data for similar purposes.

Figure 13:
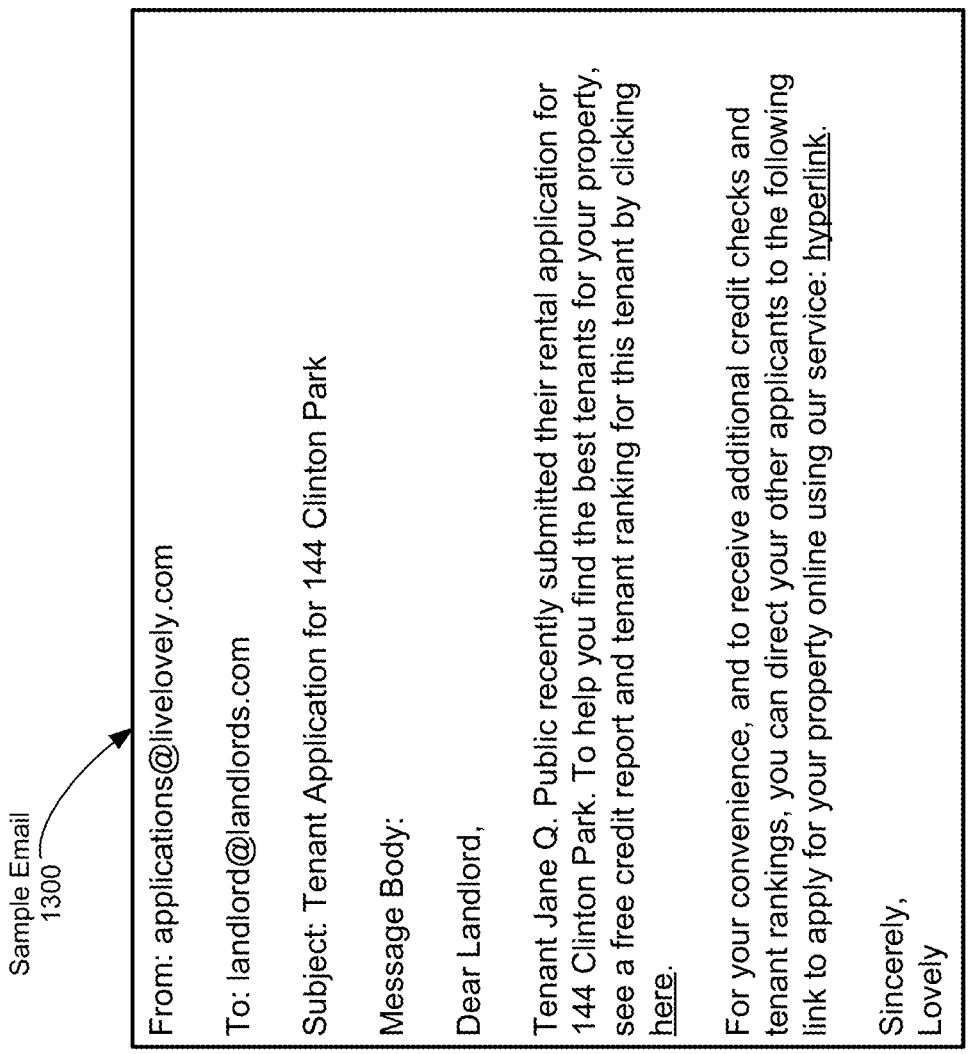
FIG. 13 shows a sample email sent in accordance with an embodiment.

Once the application is submitted, an email such as the sample email 1300 from FIG. 13 can be sent to landlords. For landlords that have not fully adopted the LiveLovely system, they could, as shown in the sample, receive the application with a hyperlink to the landlord UI (FIGS. 14-17), or they could receive an attachment, or link to an attachment, with the completed application. For landlords outside the system, payment might be handled separately or using third-party payment providers they identified, e.g. ACH information, PayPal, Square, credit card processor. For landlords using the system, the payments may be included in a running account balance that may include further payments, such as holding/returning/managing security deposits, collecting rents, and more. The allocation of fees among the operator of the listing system 120, the landlords, and the renters can be varied on a per-market and per-property basis. For example, in some markets one set of payment practices may be paid by the landlord, while in another region, those same fees are paid by the renters. Further, for any individual listing the settings can be customized.

Payments to the operator of the listing system 120 can take the form of a small transaction fee, e.g. 3% of charges, an additional surcharge for processing, a flat subscription fee, and/or a number of other permutations. As another example, the service might be free to manage up to a certain number of units, e.g. 5, after which landlords might need to pay fees.

Landlord Flow

Figure 14:
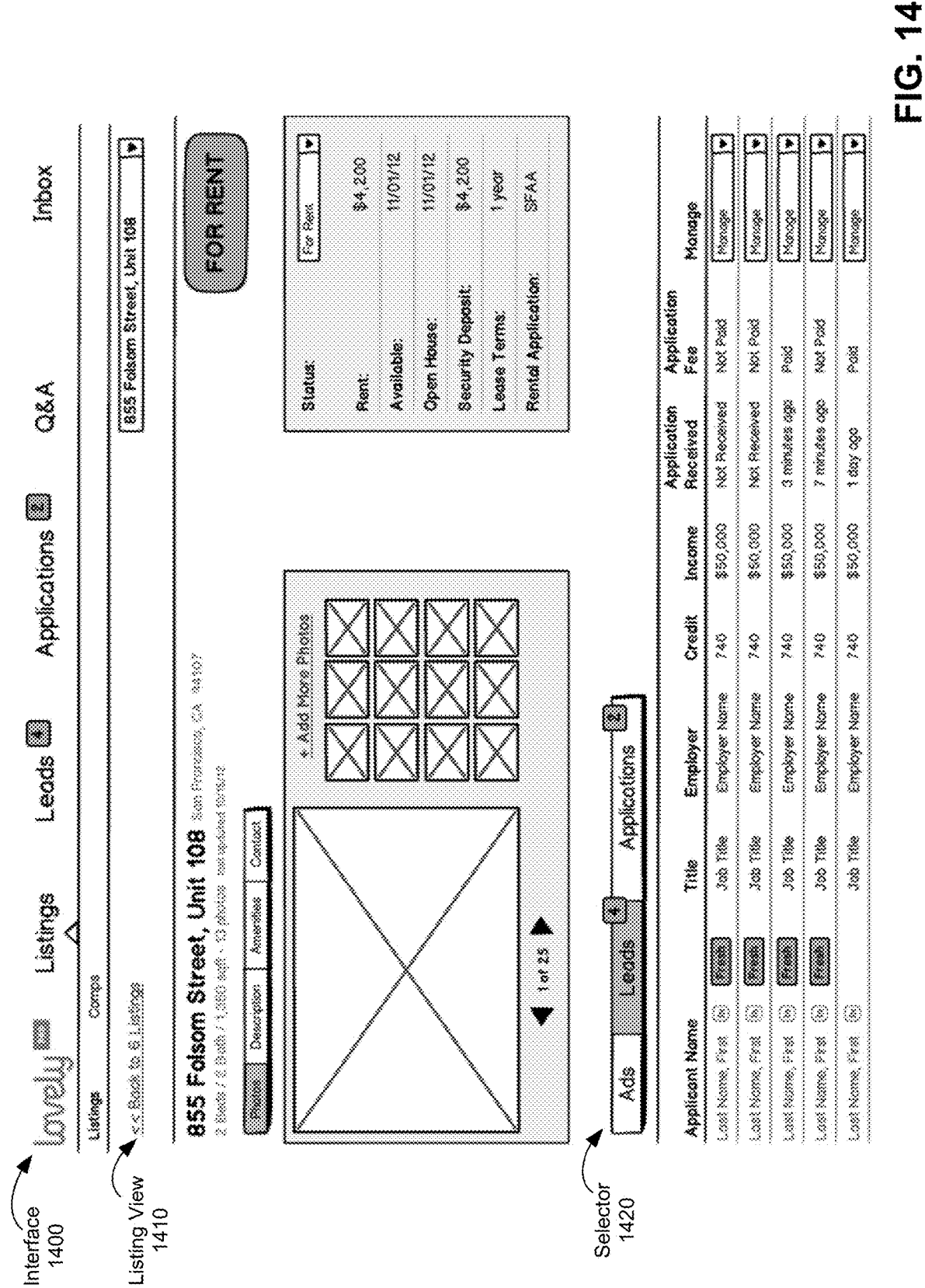
FIGS. 14-16 show a user interface in accordance with an embodiment.
Figure 15:
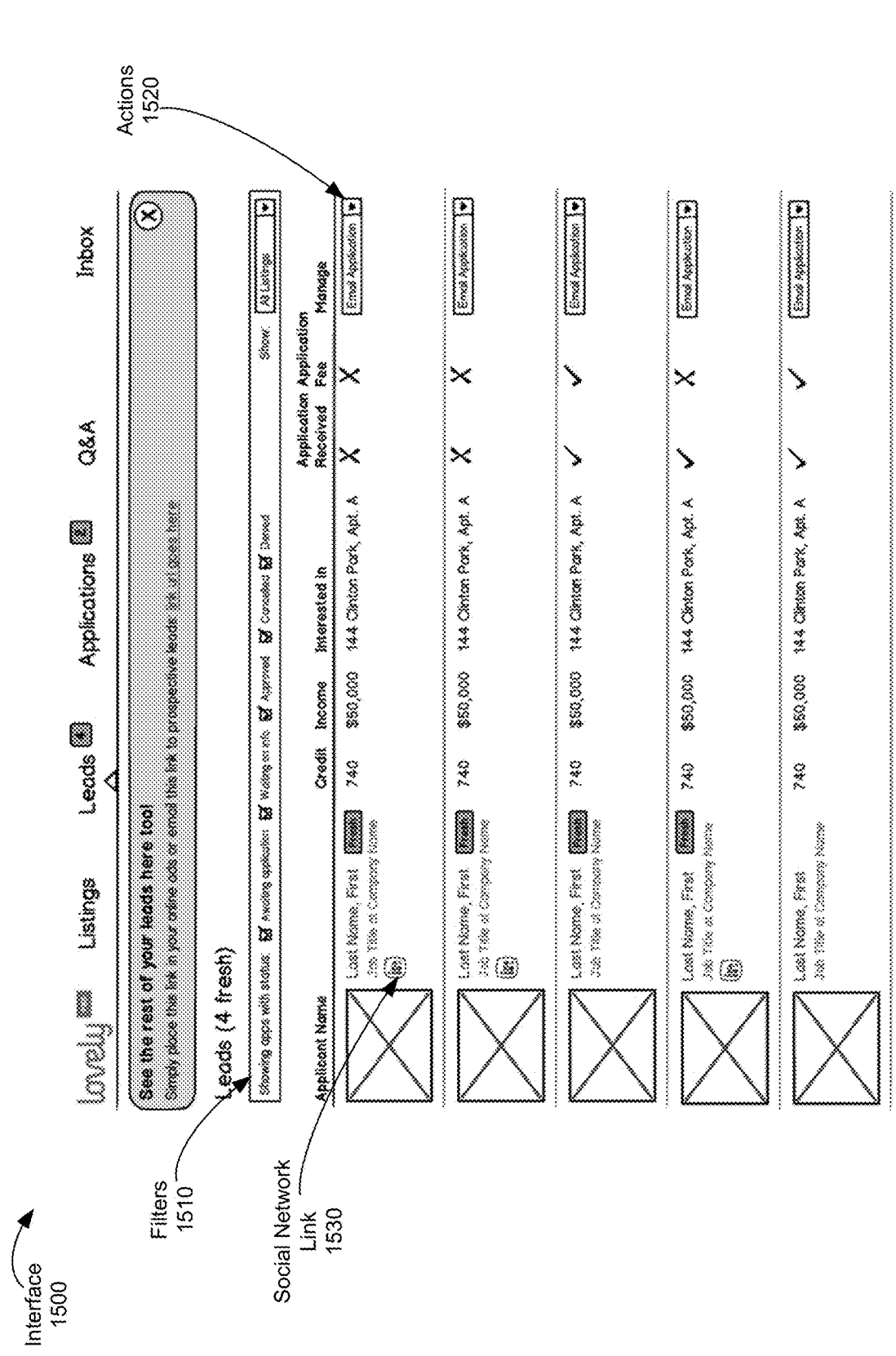
Figure 16:
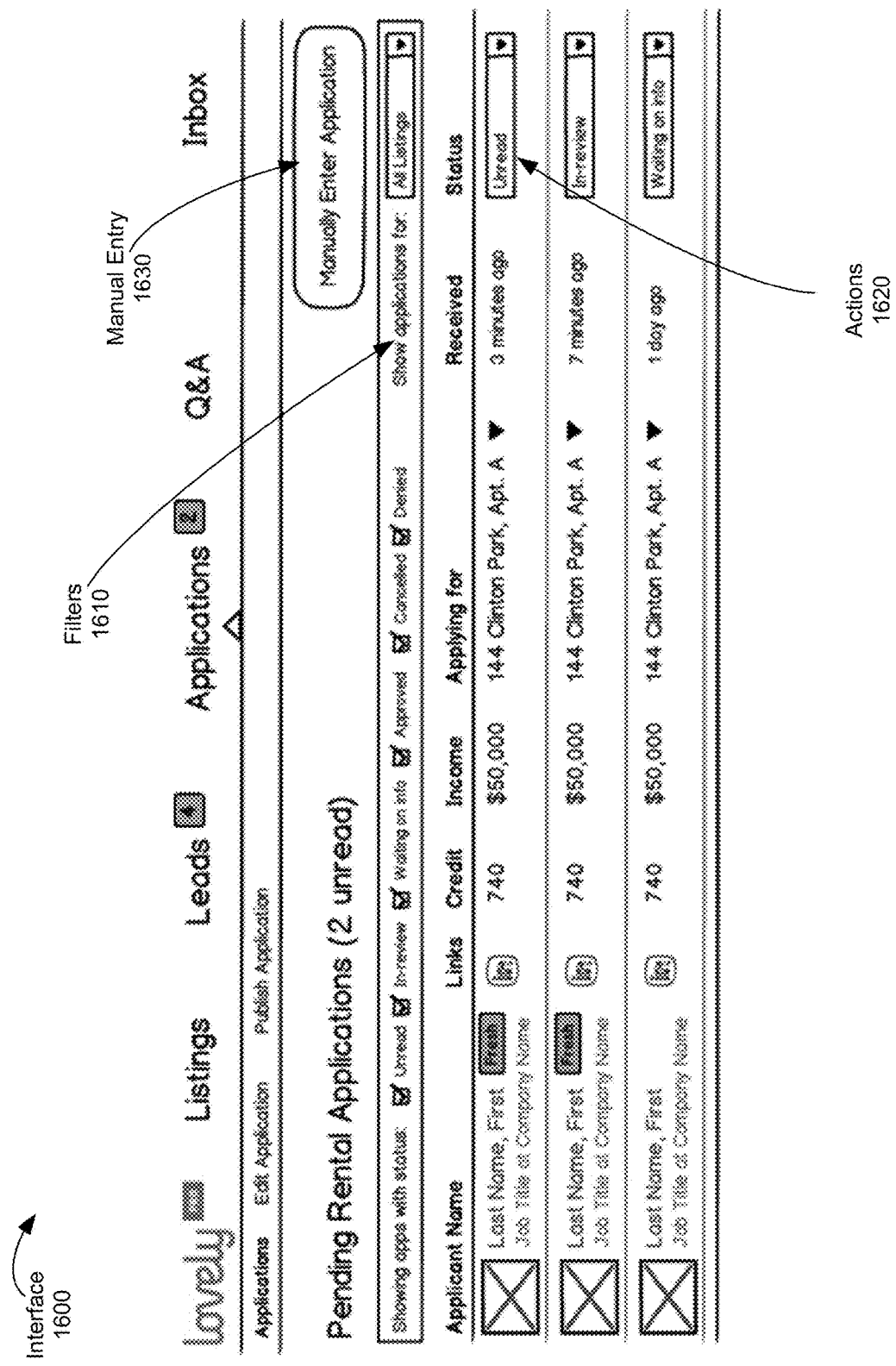
Figure 17:
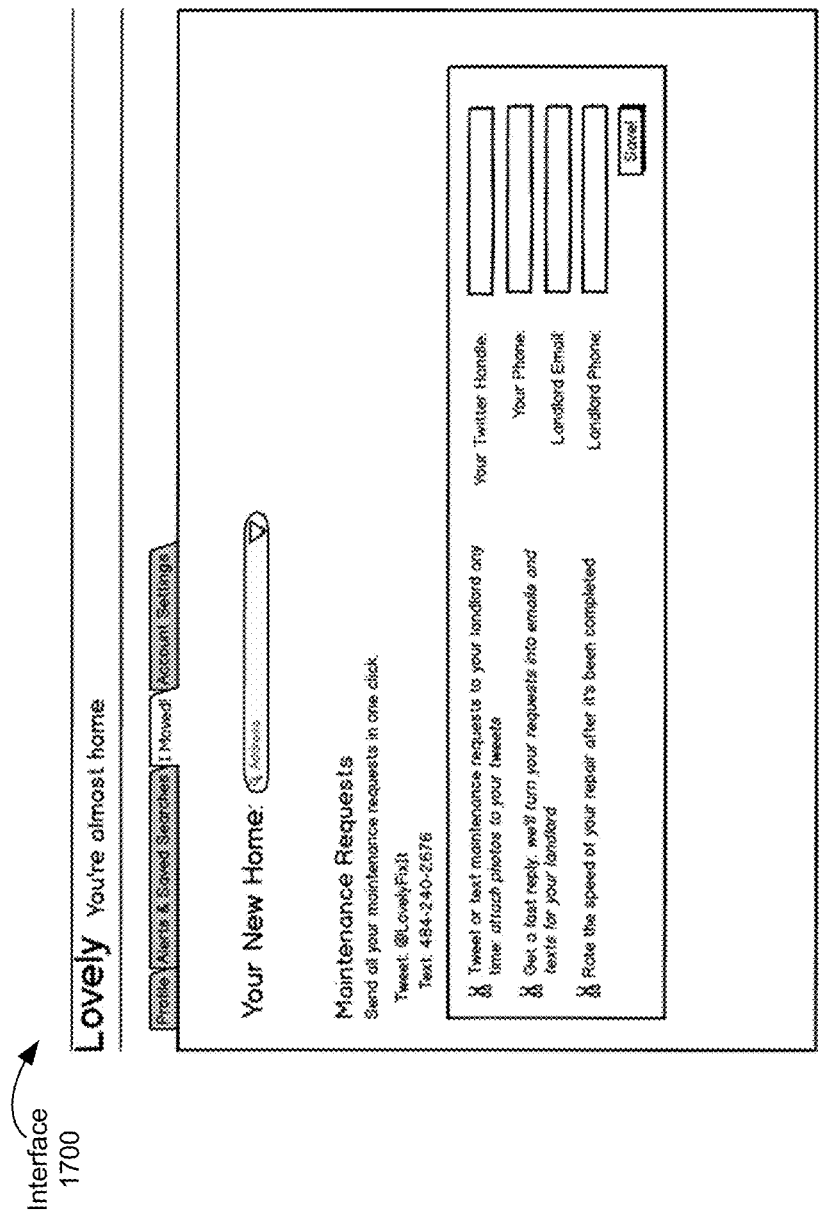

We turn now to FIGS. 14-16 which show the landlord user interface according to one embodiment. Starting with FIG. 14, interface 1400 including a listing dashboard is shown. Not shown is the listing view (listing view 1410 button) which in some embodiments includes currently rented units, together with management of the rent collection, security deposit, etc. The included interface screens are focused on the listing flow; however, the full rental management flow, including other rental management items, such as repair ticket tracking for rented units and linkages to or hosted bookkeeping, may be available in some embodiments.

Turning back to the case where a property needs to be rented, the listings dashboard of FIG. 14 highlights the status of a single property, e.g. number of prospective renters who have submitted cards/basic information ("Leads" tab), as well as recently received applications ("Applications") tab, and tracking of advertisements run by the landlord (not shown). All three tabs are accessible by a tab selector 1420. These three tabs highlight the key workflows associated with obtaining new renters. Additionally, similar tabs run across the top of the screen allowing a landlord to look at potential renters and applications across multiple listings with one click.

Next at FIG. 15 the detailed leads view is shown in interface 1500. This is similar to the smaller leads view shown in FIG. 14; however, it crosses all of the properties for the landlord by default. Near the top filters 1510 allow the landlord to filter the prospective renters shown and which properties are covered. The actions 1520 control allows the landlord to change the application status (e.g. denied, awaiting application, approved), as well as email the applicant for information. Additionally, in some embodiments, links to social network information about the individual are available (e.g. social network link 1530). This button can launch a suitable mobile application, e.g. LinkedIn in this example, open the social network profile in a web browser, and/or create an overlaid view comparable to what was done in FIG. 10.

FIG. 16 shows a detailed application view in interface 1600. This is similar to what would be shown in FIG. 14 in the "Applications" tab; however, again as in FIG. 15, it crosses all of the properties managed by the landlord by default. As in FIG. 15, there are filters 1610 and actions 1620 to adjust the view. The actions 1620 button again allows for finer-grained review of the renter's status with the application review process. The manual entry 1630 button allows for landlords to manually added entries for applications received outside the listing system 120.

Conceptually, the application view of FIG. 16 is interrelated to the view of FIG. 15 in that it is showing a subset of the universe of contacts by renters for the listing; however, it can provide more finely grained actions for renters who have reached the application process.

Maintenance Flow

We turn now to FIGS. 17-20 which show the maintenance user interface according to one embodiment. These offer a flow to allow any tenant to work with any landlord to resolve maintenance issues. Tenants are prompted to sign up with the service, e.g. interface 1700 of FIG. 17, where the move in information can be recorded. That said, this embodiment with interface 1700 supports any renter/tenant irrespective of the specific landlord. This includes capturing your rental address, twitter handle, contact information, and landlord contact information. In embodiments where move in tracking is part of the broader flow it may be unnecessary to use the interface 1700. Once tenants are enrolled, maintenance requests can be sent by Twitter, SMS, email and/or other messaging systems.

Once a request is received, e.g. via a tweet "@lovelyfixit My toilet exploded. Plese help # asap [url to picture]", the request is routed to the landlord. In one embodiment the requests are routed to the landlord, e.g. via email and SMS. For the first request—or all requests if a landlord does not sign up—to a given landlord, the landlord email can include a sign up link to manage future maintenance requests, e.g. interface 1800 of FIG. 18. This allows landlords to redirect incoming requests to other personnel, e.g. maintenance company, and also access to a tracking dashboard, e.g. interface 1900 of FIG. 19, showing all active maintenance requests for the landlord.

A typical email to a landlord is shown in FIG. 20 as sample email 2000. Notably, the email includes information that may be added by the listing system 120 that was not present in the user's ticket. Here for example, the user's maintenance request only included a Twitter handle and a picture. The listing system 120 has associated the Twitter handle with the renter information, e.g. subject line. Additionally, the email includes potential vendors relevant to solving the maintenance issue together with information about the vendors, e.g. rating and reviews. The vendors shown will be adjusted based on the tenant's location, the vendor quality, landlord preferences and/or sponsorship by vendors. In some embodiments, the links to the vendors may be affiliate links that provide a referral fee to the listing system 120.

In some embodiments, the listing system 120 may monitor Twitter feeds and/or social networking pages of third parties. For example, if a landlord has a twitter feed "@propertymanagers", that feed could be monitored for requests. In such embodiments, maintenance related requests may be identified through the use of natural language processing (NLP) techniques and/or search terms, e.g. broken, leaking, toilet. Such an approach may use a confirmation model before dispatching a work order, e.g. tweeting back "@originaltweeter Do you have a maintenance issue? click [url] to open a ticket" which might trigger something more similar to interface 1700 to allow (previously) unregistered tenants to provide their information. For those already registered the system might only require a confirmation tweet back, e.g. "yes".

Although this has been described in the context of Tweets and emails, other social networking systems, e.g. Facebook, Google Plus, or LinkedIn, could similarly be handled.

CONCLUSION AND ADDITIONAL EMBODIMENTS

We have now described a system and processes that provide improvements for listing services for tenants and landlords with key features including (i) visualization of listings for renters using clustering, especially for mobile; (ii) landlord transaction flow and support; (iii) cross-checking of data using user-initiated third-party web data, and (iv) maintenance flow and support. With respect to visualization, key aspects of this feature include: (a) dynamic development of clusters based on available listings, (b) real-time (re-) computation of clusters as the map zooms in/out, (c) adjusting the map zoom based on user interaction with the cluster marker, (d) rules for setting cluster indicator codes, (e) representing all matching listings in the region in a cluster or as a single entry at all times, (f) pop-up user interface for viewing specific listings, and (g) specific techniques for defining alerts on mobile.

Some additional embodiments and features include:

Some embodiments include automated polygon simplification algorithms for simplifying the geographical region, subdivision, neighborhood, ZIP code, and similar data received from third-party sources. The simplified polygons cover the entire map and generally have fewer boundaries than the provided polygons. Approaches based upon the Ramer-Douglas-Peucker algorithm can be used and will improve the user experience since a simplified region boundary renders more quickly and helps declutter the map. Further, because the approach is automated, it can work from changing data without the need for humans to tailor localized regions for the entire country.

Some embodiments support image-management features for listings. This helps select the first, or featured, image for a listing. This can drive greater rentals and improve the quality of the site. Some embodiments automatically categorize images, e.g. picture of property (optional interior/exterior), floorplan, people (e.g. real estate agent's picture), and other. Those categories can be used to set, or override, the preferences of the listing provider as to what images to feature/show. For example, LiveLovely has found that pictures of real estate agents are unhelpful; such pictures could be filtered out completely by the automatic categorization. Similarly, floorplan pictures have been found to be less useful for renting an apartment and could be listed later in a group of pictures to put an emphasis on pictures that show the apartment itself.

Other embodiments are PCI and/or CIP compliance to better support payments including credit cards, ACH, Dwolla and more.

Some embodiments support premium concierge-style services for potential renters. In these embodiments, customer support representatives could use an interface (not shown in FIG. 1) to review listings and interact with renter clients 150. This may also provide a valuable source of interaction for feature development and usability testing for the operator of the listing system.

Some embodiments include support to track move in status and related payments.

Some embodiments include features for connecting landlords and realtors.

Some embodiments include data analytics for potential landlords to evaluate and buy property.

Some embodiments include data de-duplication functionality to automatically detect and remove duplicate listings. Sometimes the listings are received from multiple sources, e.g. same unit in two sources. Other times, the same unit is listed by multiple brokers. This particularly happens in broker-centric markets such as New York City where there are mixture of open and closed listings; open listings tend to produce a lot of duplicates.

Still other embodiments include functionality for reporting and thus reducing bait-and-switch schemes where renters call only to be told a unit was rented and encouraged to view other listings. For example, in one embodiment for markets with open listings, for an open listing require at least two listings from different agents before including a unit in the results. This particular approach has the result of treating occurrence of an open single listing as a bait-and-switch. More nuanced approaches can be used that take into account prior broker behavior and user ratings/reports.

Still other embodiments support mobile sharing and/or linked accounts. This better supports the common use case where two people are looking for apartments together. Such embodiments can include one or more of: shared favorites; (push) notifications of favorites to the co-renter(s); a review screen for all renters to rate properties (e.g. thumbs up/thumbs down, 1-5 stars) so a consensus of the various renters' feelings is evidenced.

Some embodiments may include price trend reporting to either renters, landlords, or both. The reporting may be highly tailored to specific regions and neighborhoods.

Some embodiments may rank or order search results based on the search. Thus for example if the search included keywords for parks, the ordering of the listings 460-464 in FIG. 4 could be dependent on those keywords.

Some embodiments may offer city and/or neighborhood pages with information about an area. In some embodiments this may be available from a listing view directly (e.g. FIG. 4, not shown) or it may be from within an individual listing retrieved via the more info button 465.

Any data structures and code described or referenced above are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A method for defining an alert on a mobile device, the method comprising:
   receiving an alert creation signal on the mobile device corresponding to a display of a map region, the map region displaying a first icon representative of a plurality of physical buildings geographically located proximate to the first icon, wherein the plurality of physical buildings are represented on the map region only by the first icon and no other media corresponding to the plurality of physical buildings, the first icon having displayed thereon a first number indicator representative of a total number of physical buildings included in the plurality of physical buildings, and wherein a particular color of the first icon indicates a user's prior viewing history with respect to at least one of the plurality of physical buildings;
   receiving a listing selection signal on the mobile device corresponding to selection of the first icon;
   in response to receiving the listing selection signal, retrieving listing information from a remote database at a listing system, the listing information comprising pertinent rent, lease, or purchase data corresponding to listings associated with each of the plurality of physical buildings represented by the first icon;
   displaying a first set of listings in a listing pane, wherein the listing pane is displayed adjacent to the display of the map region, and wherein the first set of listings comprises listing information corresponding to the plurality of physical buildings represented by the first icon;
   receiving a map adjustment signal on the mobile device, the map adjustment signal corresponding to an input to perform a zoom-in function with respect to display of the map region;
   adjusting the display of the map region responsive to the map adjustment signal using the mobile device to define an adjusted map region, the adjusted map region comprising a display of a zoomed-in version of the map region;
   responsive to the map adjustment signal, displaying a second icon on the adjusted map region, the second icon representative of a subset of physical buildings contained within the plurality of physical buildings represented by the first icon, wherein the subset of physical buildings are represented on the adjusted map region only by the second icon and no other media corresponding to the subset of physical buildings, the second icon having displayed thereon a second number indicator representative of a total number of physical buildings included in the subset of physical buildings, and wherein a particular color of the second icon indicates the user's prior viewing history with respect to at least one of the subset of physical buildings;
   modifying the listing pane to display a second set of listings comprising listing information corresponding to the subset of physical buildings represented by the second icon; and
   defining an alert and associating the alert with the adjusted map region, wherein the alert relates to at least one physical building in the subset of physical buildings displayed within the listing pane.

2. The method of claim 1, further comprising:
   displaying a plurality of input mechanisms for receiving a plurality of filtering criteria, the filtering criteria defining non-geographic aspects of the alert.

3. The method of claim 2, wherein the plurality of filtering criteria selected from a set including one or more of: a low price, a high price, a pets accepted, a cats accepted, a dogs accepted, photos available, number of bedrooms, and number of bathrooms.

4. The method of claim 1, wherein the plurality of physical buildings comprises one or more apartment units.

5. The method of claim 1, wherein the particular color of the first icon is from the group consisting of red, yellow, blue, grey, and black, and wherein:
   red indicates at least one newly-listed building included in the plurality of physical buildings;
   yellow indicates that the user's prior favorite physical building is included in the plurality of physical buildings;
   blue indicates at least one unviewed physical building included in the plurality of physical buildings;
   grey indicates that all of the physical buildings included in the plurality of physical buildings have been viewed; and
   black indicates that a particular physical building searched-for by the user is included in the plurality of physical buildings.

6. The method of claim 1, wherein the particular color of the second icon is from the group consisting of red, yellow, blue, grey, and black, and wherein:
   red indicates at least one newly-listed building included in the subset of physical buildings;
   yellow indicates that at least one of the user's prior favorite physical buildings is included in the subset of physical buildings;

blue indicates that at least one unviewed physical building is included in the subset of physical buildings;

grey indicates that all of the physical buildings included in the subset of physical buildings have been viewed; and black indicates that a particular physical building searched-for by the user is included in the subset of physical buildings.

\* \* \* \* \*